United States Patent
Steyer et al.

(10) Patent No.: US 6,988,674 B2
(45) Date of Patent: Jan. 24, 2006

(54) METHOD AND APPARATUS FOR SUPPRESSING INFRARED SIGNATURES

(75) Inventors: William Steyer, Topsfield, MA (US); Christopher Marlow Kieffer, Revere, MA (US); John Michael Jasany, Cincinnati, OH (US); Jacob Hoffman, Ipswich, MA (US)

(73) Assignee: General Electric Company, Cincinnati, OH (US)

( * ) Notice: Subject to any disclaimer, the term of this patent is extended or adjusted under 35 U.S.C. 154(b) by 25 days.

(21) Appl. No.: 10/862,994

(22) Filed: Jun. 8, 2004

(65) Prior Publication Data

US 2005/0268595 A1    Dec. 8, 2005

(51) Int. Cl.
F02K 3/00         (2006.01)
(52) U.S. Cl. ................................... 239/265.19
(58) Field of Classification Search ............... 60/264, 60/772; 239/265.17, 265.19, 127.3
See application file for complete search history.

(56) References Cited

U.S. PATENT DOCUMENTS

| | | | |
|---|---|---|---|
| 3,210,934 A | * | 10/1965 | Smale ........................ 60/265 |
| 3,693,880 A | | 9/1972 | Versaw et al. |
| 3,710,890 A | | 1/1973 | True et al. |
| 3,889,882 A | | 6/1975 | Hull, Jr. et al. |
| 3,921,906 A | | 11/1975 | Nye et al. |
| 3,970,252 A | | 7/1976 | Smale et al. |
| 3,981,143 A | | 9/1976 | Ross et al. |
| 4,002,024 A | | 1/1977 | Nye et al. |
| 4,004,416 A | | 1/1977 | Amelio et al. |
| 4,007,587 A | | 2/1977 | Banthin et al. |
| 4,018,046 A | | 4/1977 | Hurley |
| 4,044,555 A | | 8/1977 | McLoughlin et al. |
| 4,136,518 A | | 1/1979 | Hurley et al. |
| 4,295,332 A | | 10/1981 | Steyer et al. |
| 4,369,937 A | | 1/1983 | LeBell et al. |
| 4,942,732 A | * | 7/1990 | Priceman .................. 60/766 |
| 5,746,047 A | * | 5/1998 | Steyer et al. .............. 60/39.5 |
| 6,253,540 B1 | | 7/2001 | Chew et al. |

* cited by examiner

Primary Examiner—Ehud Gartenberg
(74) Attorney, Agent, or Firm—Sonnenschein Nath & Rosenthal LLP

(57) ABSTRACT

An infrared signature suppression system for reducing infrared radiation emitted by a vehicle. The system includes an elongate duct mounted on the vehicle having a hollow interior extending along an axial centerline between an upstream end and a downstream end for transporting exhaust gas emitted by the vehicle, and a baffle positioned in the hollow interior of the duct between the upstream end and the downstream end. At least a portion of at least one of the duct and the baffle includes an emissivity coating for reducing infrared radiation emitted by the vehicle.

19 Claims, 8 Drawing Sheets

METHOD AND APPARATUS FOR SUPPRESSING INFRARED SIGNATURES

BACKGROUND OF THE INVENTION

The present invention relates generally to gas turbine engines, and more specifically to a method and apparatus for suppressing the infrared signature of a gas turbine engine.

Gas turbine engines typically include a compressor, a combustor, and a turbine section. Airflow entering the compressor is compressed and channeled to the combustor, wherein air is mixed with a fuel and ignited within a combustion chamber to produce combustion gases. The combustion gases are channeled to the turbine section that extracts energy from the combustion gases for powering the compressor. The turbine section may include two independent turbines. One turbine extracts energy from the combustion gases to power the compressor. The other turbine may be used to power an output shaft connected to a load, such as a fan, an electrical generator, or a helicopter rotor. The combustion gases exiting the turbine(s) are discharged from the engine through an engine exhaust.

A growing importance within the field of weapons detection technology is reducing the infrared signature associated with gas turbine engines used to power military aircraft and land combat vehicles. Signature reductions may reduce detection and pursuit by enemy anti-aircraft equipment such as heat-seeking missiles. Some known systems for suppressing infrared radiation signatures from gas turbine engines use a center plug positioned within the engine exhaust to block line of sight to hot turbine parts of the engine. Other known systems eject hot exhaust gases at a substantial angle from an axial centerline of the engine to reduce the infrared signature of the engine. However, such known suppression systems may have size and weight disadvantages, in addition to possible installation penalties in engine performance.

Additionally, due to associated performance penalties it may be undesirable to use infrared suppression systems when an aircraft or vehicle is operating under non-combat conditions. Accordingly, some known infrared suppression systems are removed from the aircraft or vehicle when the aircraft or vehicle is operating under non-combat conditions. However, removing infrared suppression systems from aircraft/vehicles may be difficult and time-consuming.

SUMMARY OF THE INVENTION

In one aspect, the present invention includes an infrared signature suppression system for reducing infrared radiation emitted by a vehicle. The system includes an elongate duct mounted on the vehicle having a hollow interior extending along an axial centerline between an upstream end and a downstream end for transporting exhaust gas emitted by the vehicle, and a baffle positioned in the hollow interior of the duct between the upstream end and the downstream end. At least a portion of at least one of the duct and the baffle includes an emissivity coating for reducing infrared radiation emitted by the vehicle.

In another aspect, the present invention includes an aircraft propulsion system for powering an airframe during flight. The aircraft propulsion system includes an aircraft engine having an outlet, and an infrared signature suppression system mounted downstream from the aircraft engine outlet for reducing infrared radiation emitted by the engine. The infrared signature suppression system includes an elongate duct mounted downstream from the aircraft engine for transporting exhaust gas emitted by the engine outlet, wherein the duct has a hollow interior extending along a centerline between an upstream end of the duct and a downstream end of the duct. The infrared signature suppression system further includes a baffle mounted inside the hollow interior of the duct for obstructing from the downstream end line-of-sight observation of the metal engine components, and an emissivity coating applied to at least one of the duct and the baffle.

In yet another aspect, a method is provided for suppressing an infrared radiation signature in an infrared signature suppression system including an elongate duct having a hollow interior, and a baffle positioned in the hollow interior. The method includes applying an emissivity coating to at least one of the duct and the baffle.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
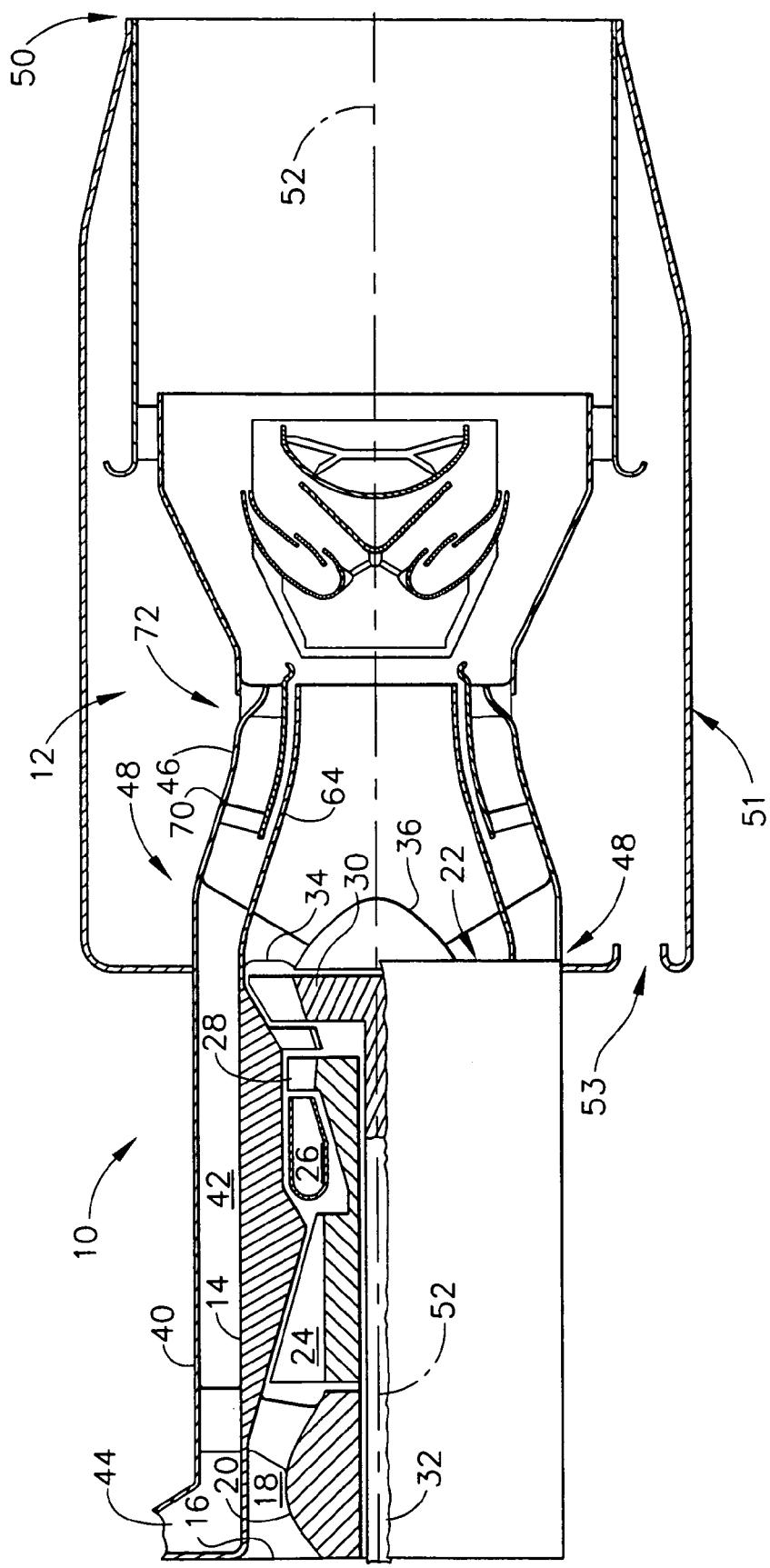
FIG. 1 is a cross-sectional schematic of a gas turbine engine having an infrared suppression system of the present invention.

Referring now to the drawings, FIG. 1 is a cross-sectional schematic of a gas turbine engine 10 having an infrared suppression system 12 for reducing infrared radiation emitted from the engine 10. The gas turbine engine 10 includes an outer casing 14 having an open upstream end 16 to provide an airflow inlet. An annular passageway 18 defined by the outer casing 14 and an inner flowpath 20 extends axially from the upstream end 16 to a downstream end 22 of the engine 10. Air entering the upstream end 16 flows along the annular passageway 18 through a compressor 24 wherein the air is compressed. The compressed air from the compressor 24 is channeled to a combustor 26, wherein it is mixed with a fuel and ignited to produce hot combustion gases. The hot combustion gases are channeled from the combustor 26 to drive a turbine 28 that drives the compressor 24 and a low pressure turbine 30 that drives a turbine shaft 32 used to power an external mechanism, such as a helicopter rotor.

After passing through the turbines 28, 30, the hot combustion gases are exhausted through an annular turbine outlet 34 defined generally between a center plug 36 and the downstream end 22 of the outer casing 14 of the engine 10. A hollow cylindrical shell 40 surrounds the outer casing 14 to define an engine bay cavity 42. Cooling air may be directed into the cavity 42 through an inlet 44 to cool components of engine 10, along with aircraft (or other vehicle) components, and to provide cooling air to the infrared suppression system 12, as described below.

The infrared suppression system 12 is coupled to the downstream end 22 of the engine 10 and includes an axially extending elongate duct 46 having a hollow interior extending between an upstream end 48 of the duct 46 and a downstream end 50 of the duct 46. The duct 46 receives the flow of hot combustion gases exhausted from the engine 10 and transports the hot combustion gases from the upstream end 48 to the downstream end 50 generally along a centerline 52. The duct 46 may be surrounded by a hollow shell 51 having an opening 53 for receiving ambient air.

Figure 2:
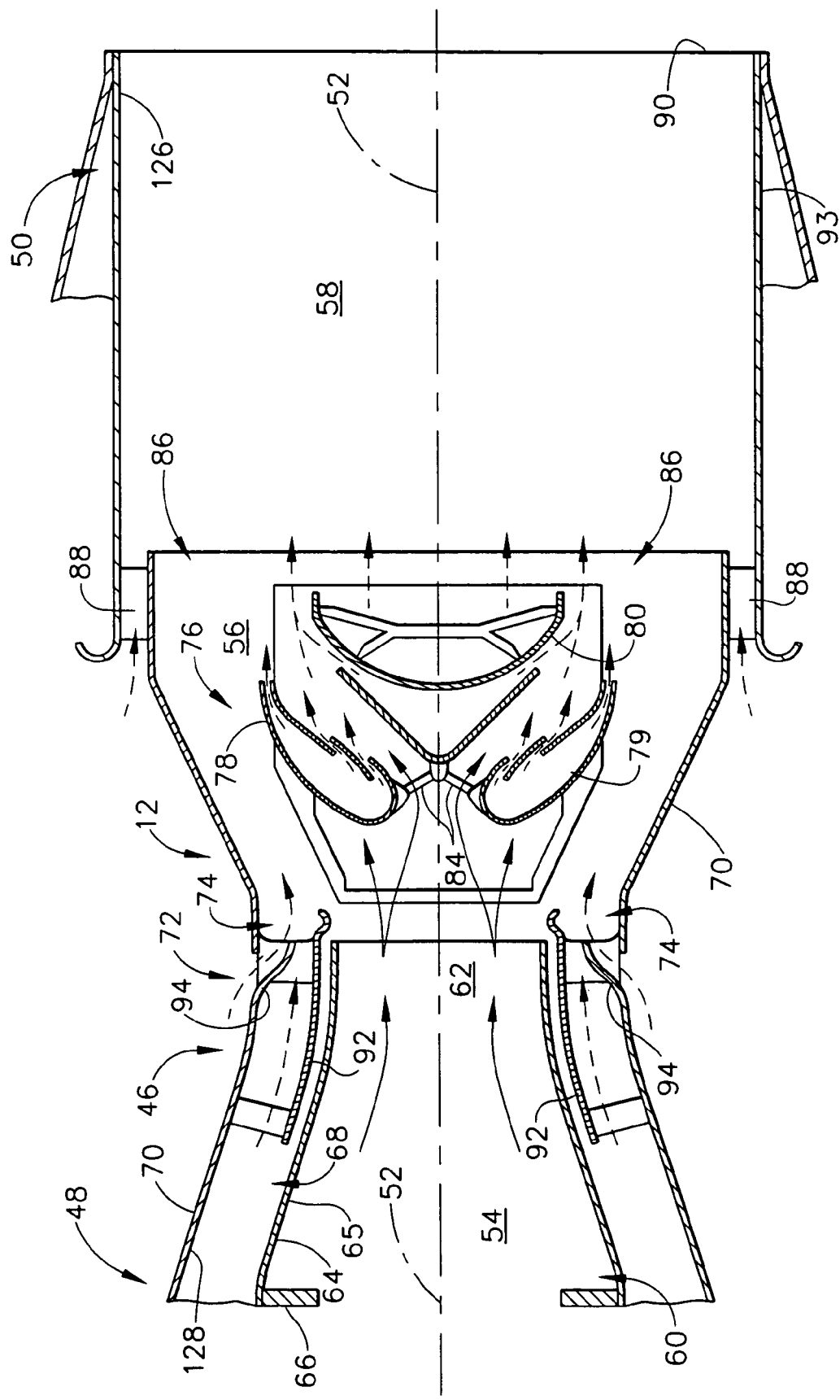
FIG. 2 is a detail of the infrared suppression system shown in FIG. 1.
Figure 3:
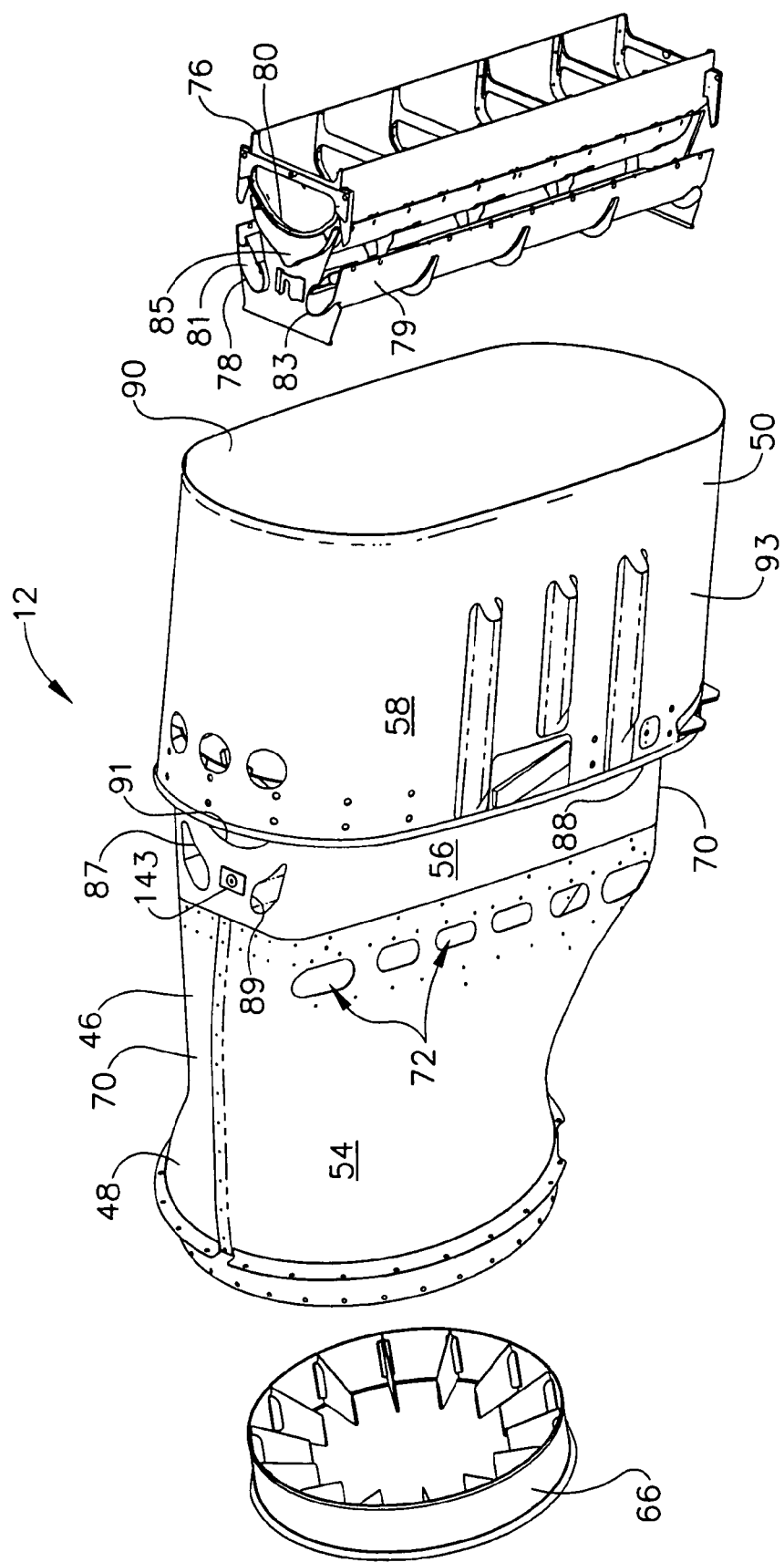
FIG. 3 is a separated perspective of the infrared suppression system shown in FIG. 2.

FIG. 2 is a detail of the infrared suppression system 12. FIG. 3 is a separated perspective of the infrared suppression system 12 shown in FIG. 2. As illustrated herein, the flow of the hot combustion gases through the infrared suppression system 12 is generally indicated by the solid-lined arrows in FIG. 2, and the flow of cooling air through the infrared suppression system is generally shown by the dash-lined arrows. The elongate duct 46 includes a transition section 54 adjacent the upstream end 48, an intermediate section 56 downstream from the transition section 54, and an exhaust section 58 downstream from the intermediate section 56 and adjacent the downstream end 50. The transition section 54 receives the hot combustion gases exhausted from the turbine outlet 34. The transition section 54 includes an upstream end 60 adjacent the upstream end 48 of the duct 46, a downstream end 62 adjacent the intermediate section 56 of the duct 46, and an inner duct 64 extending through the section 54 along the centerline 52. The inner duct 64 includes an inner surface 65. The inner duct 64 has a generally circular cross-section adjacent the upstream end 60 of the section 54 and transitions to a rectangular cross-section at the downstream end 62. The hot combustion gases exhausted through the turbine outlet 34 are received at the upstream end 60 and transitions from a generally circular flow pattern to a generally rectangular flow pattern as the flow moves downstream through the upstream and downstream ends 60, 62 of the transition section 54. In one embodiment, the transition section 54 includes a deswirling device 66 connected to the duct 64 adjacent the upstream end 60 of the section 54 and the upstream end 48 of the duct 64 for deswirling the hot combustion gases entering the elongate duct 64 and thereby reducing hot streaks on downstream components caused by the hot combustion gases.

Ambient air and cooling air flowing through the engine bay cavity 42 are drawn into a cavity 68 formed between the inner duct 64 and an inner shell 70 of the duct 46 by pressure forces in the duct resulting from the rapid flow of the hot combustion gases through the duct. Some additional cooling air is drawn into the cavity 68 of the transition section 54 through a plurality of gaps 72 (FIGS. 1–3) in the inner shell 70.

The hot combustion gases leave the transition section 54 at its downstream end 62 and enter the intermediate section 56. The cooling air in the cavity 68 is directed to the intermediate section 56 through at least one opening 74. The intermediate section 56 of the duct 46 includes a baffle assembly 76 that blocks line-of-sight viewing to any hot metal components of the engine 10 and the infrared suppression system 12, and facilitates mixing cool air with the hot combustion gases flowing through the intermediate section 56. The baffle assembly 76 includes a pair of outer baffles 78, 79 and an inner baffle 80. Any of the baffles 78, 79, 80 may be referred to herein as a first or a second baffle. The baffle assembly 76 and each of the baffles 78, 79, 80 will be described in greater detail below. The outer baffles 78, 79 are positioned downstream from the opening 74 and divide the flow of hot combustion gases into two outer streams and an inner gas stream. The inner baffle 80 is positioned at least partly between and at least partly downstream from the outer baffles 78, 79, and divides the inner gas stream into an upper and lower inner gas stream. The two outer gas flows and the upper and lower inner gas flows recombine further downstream within the inner shell 70.

As illustrated in FIG. 3, each of the baffles 78, 79, 80 extend laterally across the interior of the duct 46. Each baffle 78, 79, 80 includes a respective interior passage 81, 83, 85 which is open to ambient air through a respective opening 87, 89, 91 within the inner shell 70. The baffles 78, 79, 80 draw cool ambient air through each respective opening 87, 89, 91 into the respective interior passages 81, 83, 85 of the baffles 78, 79, 80. The cool ambient air flowing through the baffles 78, 79, 80 is discharged from downstream portions of the baffles 78, 79, 80 into the hot combustion gases flowing through the intermediate section 56 of the duct 46. The outer baffles 78, 79 are coupled to each other and the inner baffle 80 by a plurality of struts 84. In addition to the cool ambient air supplied to the interior passages 81, 83, 85 and discharged into the hot combustion gases, cooling air flowing through the cavity 68 is delivered to the intermediate section 56 through the opening 74. The cool ambient air discharged from the baffles 78, 79, 80 and the cooling air delivered from the cavity 68 mix with the hot combustion gases in the intermediate section 56.

As illustrated in FIG. 2, the mixture of gases within the intermediate section 56 are directed through a downstream end 86 of the intermediate section 56 and into the exhaust section 58, which is defined by an outer shell 93 of the duct 46. A plurality of ambient air inlets 88 are provided between the intermediate section 56 and the exhaust section 58 to draw additional cool ambient air into the exhaust section 58 of the duct 46 to mix with the mixture of gases exiting the intermediate section 56. This mixture of gases is then exhausted through a suppression system exhaust opening 90. The exhaust section 58 is of sufficient length that the hot metal components of the engine 10 and the suppression system 12 cannot be viewed through the exhaust opening 90. Additionally, the duct 46 includes a plurality of inner and outer line of sight shields 92, 94, respectively. Preventing line-of-sight viewing of hot metal components of the engine 10 and the system 12 reduces infrared radiation emitted from the engine 10 through the exhaust opening 90. The outer line of sight shields 94 also facilitate guiding the additional cooling air that is drawn into the cavity 68 through the gaps 72.

Figure 4:
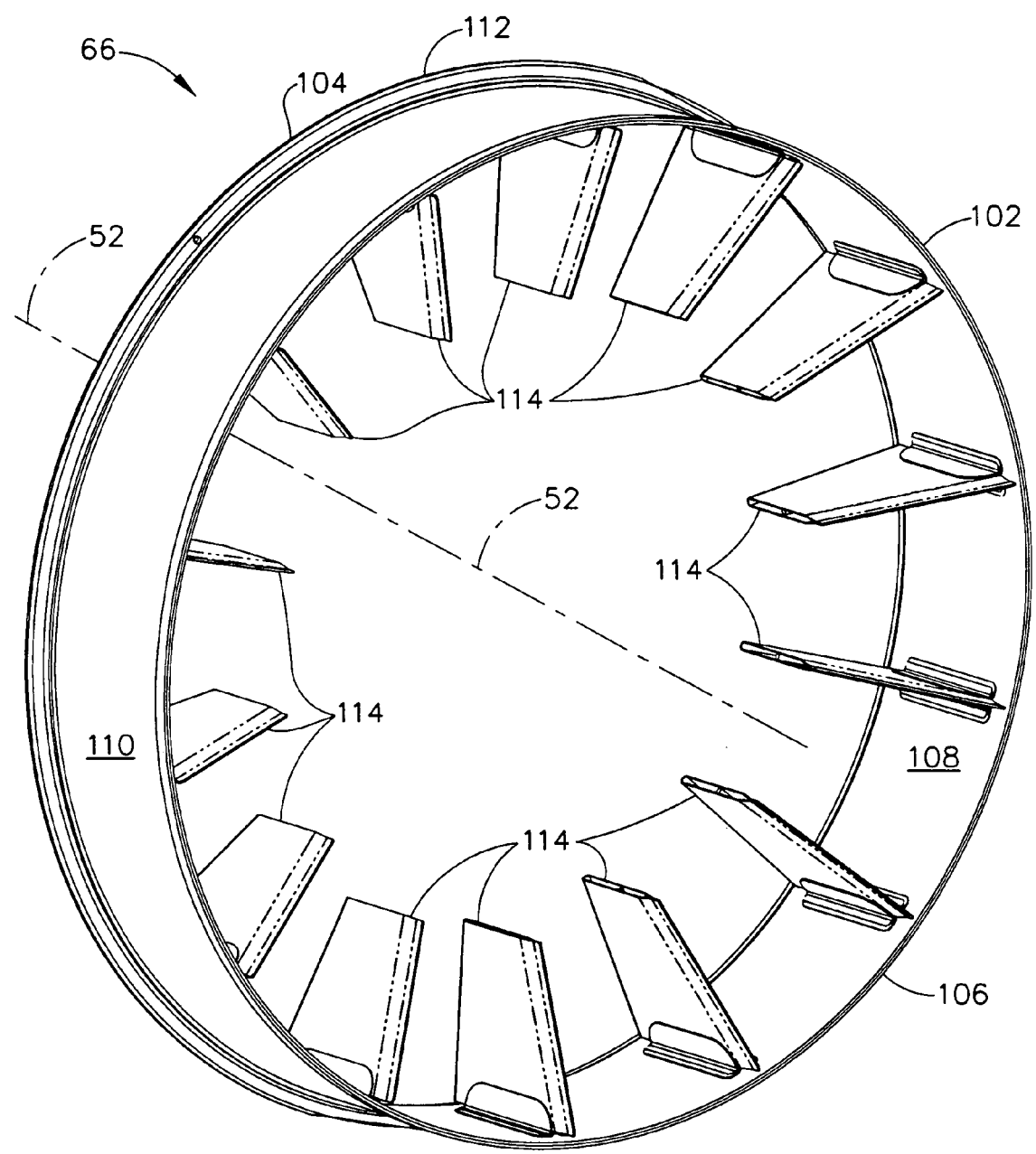
FIG. 4 is a perspective of a deswirling device used with the infrared suppression system shown in FIG. 2.

FIG. 4 is a perspective of the deswirling device 66. The deswirling device 66 has an annular shell 102 extending between an upstream end 104 and a downstream end 106. The shell 102 has a radially inner surface 108, a radially outer surface 110, and a flange 112 extending radially outward from the outer surface 110 adjacent the upstream end 104. A plurality of vanes 114 spaced circumferentially around the inner surface 108 extend radially inward from the inner surface 108 toward the centerline 52. In one embodiment, the vanes 114 are spaced equally around the circumference of the inner surface 108. Additionally, in the exemplary embodiment, the deswirling device 66 includes fourteen vanes 114 spaced around the circumference of the inner surface 108. However, it should be understood that the deswirling device 66 may include any number of the vanes 114. The deswirling device 66 is partially received within the upstream end 48 of the elongate duct 46 and is connected to the inner duct 64 of the duct transition section 54 through a flexible sealing arrangement. The flange 112 facilitates connecting the deswirling device 66 to the engine outer casing 14 (FIG. 1) so the deswirling device 66 is fixedly secured to the engine 10 (FIG. 1). The vanes 114 deswirl the hot combustion gases as they enter the elongate duct 46 to provide a generally uniform flow of the hot combustion gases through the elongate duct 46 thereby facilitating the reduction of hot streaks on the surfaces of the intermediate section 56 and the exhaust section 58.

Figure 5:
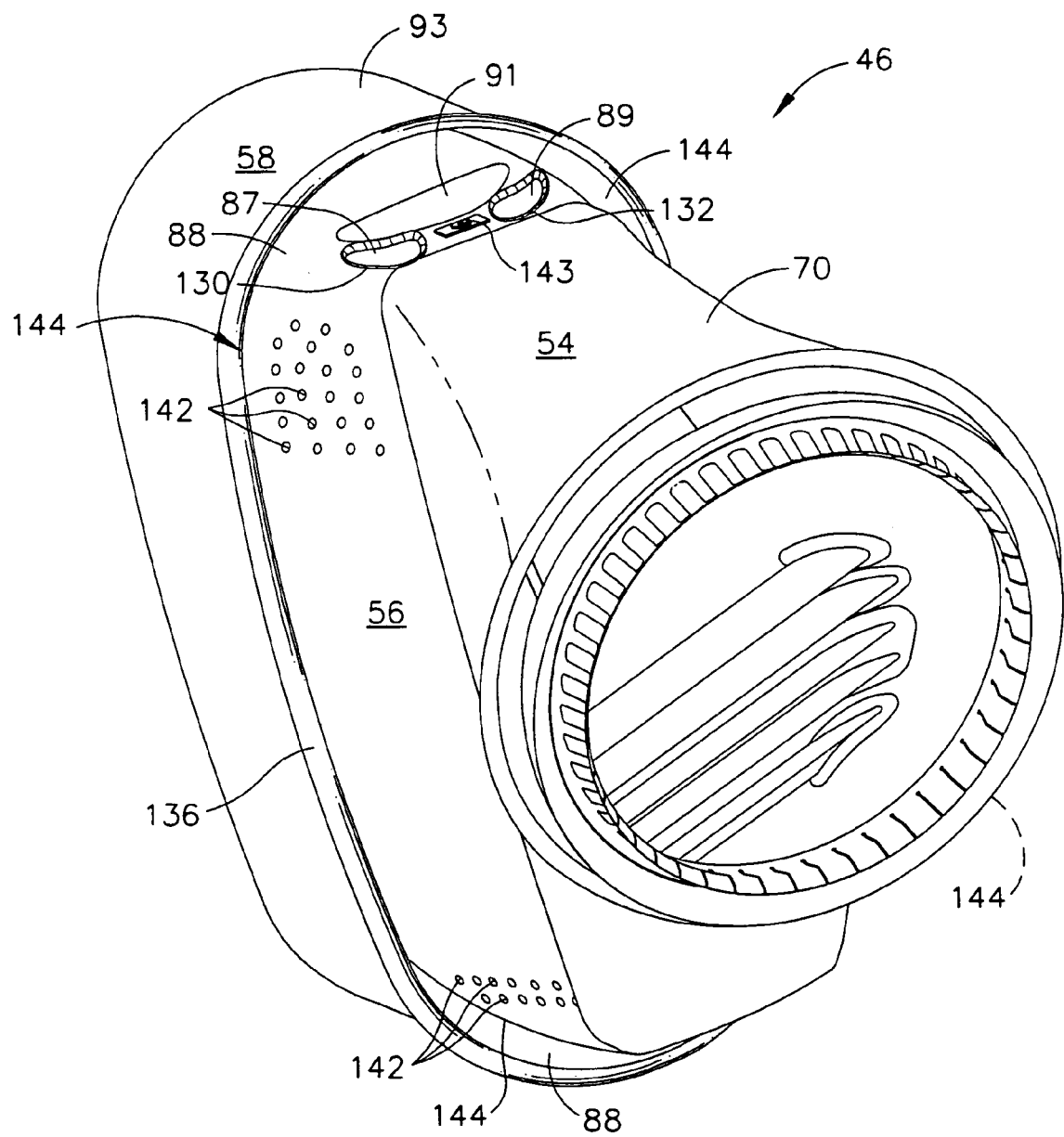
FIG. 5 is a perspective of a duct forming part of the infrared suppression system shown in FIG. 2.
Figure 6:
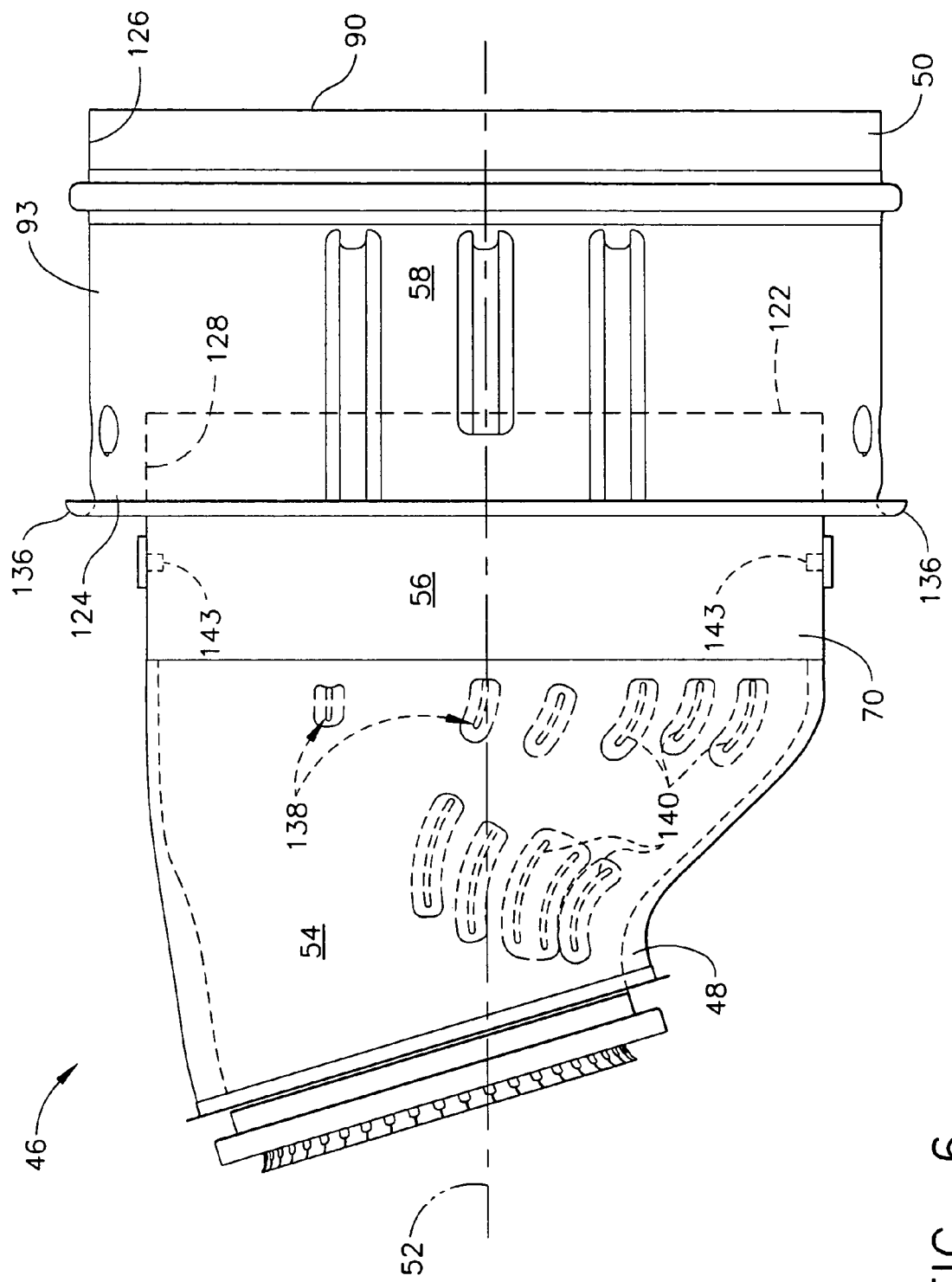
FIG. 6 is a side elevation of the duct shown in FIG. 5.

FIG. 5 is a perspective of the elongate duct 46, and FIG. 6 is a side elevation of the duct 46. As previously described, the duct 46 includes the transition section 54, the intermediate section 56, and the exhaust section 58, each defined by one or both of the inner shell 70 and the outer shell 93. The outer shell 93 is spaced radially outward from and coupled to the inner shell 70. The inner shell 70 extends between the upstream end 48 of the duct 46 and a downstream end 122 of the shell 70. The outer shell 93 extends between an upstream end 124 of the shell 93 and the downstream end 50 of the duct 46. A portion of the downstream end 122 of the inner shell 70 is received within the upstream end 124 of the outer shell 93 and is coupled to an inner surface 126 of the outer shell 93. The inner shell 70 includes an inner surface 128 that is at least partially coated with a high-emissivity material to reduce the reflection of infrared radiation from hot metal components of the engine 10 and the infrared suppression system 12 off of the inner surface 128 of the inner shell 70. Although other materials may be used without departing from the scope of the present invention, in one embodiment the inner surface 128 is coated with at least one of Rust-Oleum® Flat Black paint, available from Rust-Oleum Corporation of Vernon Hills, Ill., and Dupli-Color® DH 1602 High Heat Black, available from Dupli-Color Products Company of Cleveland, Ohio.

In one embodiment, a portion 130 of the inner shell 70 defining the boundary of the opening 87 is curved outward as shown in FIG. 5 to facilitate generally smooth and uniform airflow into the passageway 81 of the baffle 78. In one embodiment, the portion 130 of the shell 70 includes a radius of about 0.5 inches. Additionally, in one embodiment a portion 132 of the inner shell 70 defining the boundary of the opening 89 is curved outward as shown in FIG. 5 to facilitate generally smooth and uniform airflow into the passageway 83 of the baffle 79. In one embodiment, the portion 132 of the shell 70 includes a radius of about 0.5 inches.

As described above, the duct 46 includes a plurality of ambient air inlets 88 between the intermediate section 56 and the exhaust section 58 to draw additional cool ambient air into the exhaust section 58 of the duct 46 to mix with the gases exiting the intermediate section 56. More specifically, the inlets 88 are defined by the radial space between the inner shell 70 and the outer shell 93. In an alternative embodiment, the duct 46 includes only one ambient air inlet 88. It should be understood that as described herein the duct 46 may include any number of ambient air inlets 88. In one embodiment, a portion 136 of the outer shell 93 defining an outer boundary of the openings 88 is curved outward as shown in FIGS. 5 and 6 to facilitate generally smooth and uniform airflow into the exhaust section 58. In one embodiment, the portion 136 of the shell 70 includes a radius of about 1.5 inches.

The duct 46 includes a plurality of struts 138 (FIG. 6) positioned circumferentially along the inner surface 65 (shown in FIG. 2) of the transition section inner duct 64 (shown in FIG. 2) adjacent the downstream end 62 of the section 54. The struts 138 support the inner duct 64 at the downstream end 62 so it retains its generally rectangular cross-sectional shape during operation of the engine 10, and more specifically during flow of gases through the transition section 54. In one embodiment, the struts 138 are spot welded to the inner surface 65. The duct 46 also includes a plurality of turning vanes 140 (FIG. 6) positioned within the inner duct 64 between the upstream end 60 and the downstream end 62 of the transition section 54. The vanes 140 are coupled to the inner surface 65 of the duct 64 and extend radially inwardly toward the centerline 52. The turning vanes 140 facilitate transition from a generally circular flow pattern to a generally rectangular flow pattern as the flow of combustion gases moves downstream through the section 54 so the flow of gases is generally uniform at the downstream end 62. In one embodiment, the transition section 54 includes four turning vanes 140. However, it should be understood that the transition section 54 may include any number of turning vanes 140 without departing from the scope of the present invention. Additionally, in one embodiment, the turning vanes 140 are coupled to the inner surface 65 such that the vanes 140 can move relative to the duct 64 to accommodate thermal expansion and contraction of the vanes 140 and the duct 64.

The duct 46 also includes a plurality of openings 142 in the inner shell 70 adjacent corners 144 of the intermediate section 56. Each corner 144 includes a plurality of openings 142. The openings 142 draw additional cool ambient air into the intermediate section 56 of the duct 46 which mixes with the hot combustion gases within the section 56. In one embodiment, the openings 142 are generally circular. Additionally, the duct 46 includes a plurality of guide pins 143 positioned on the inner shell 70 for coupling the baffle assembly 76 to the duct 46.

Figure 7:
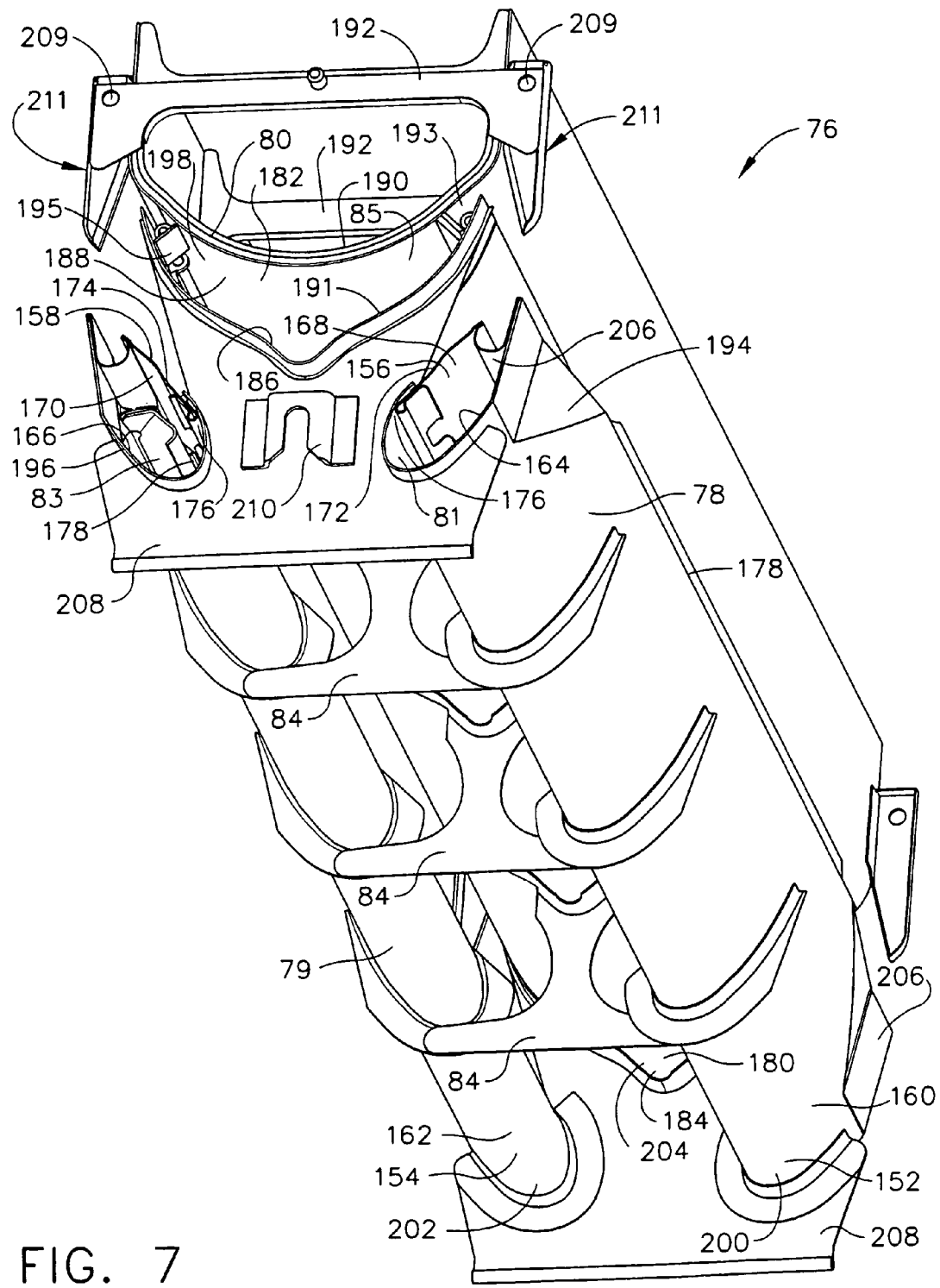
FIG. 7 is a perspective of a baffle assembly used with the infrared suppression system shown in FIG. 2.

FIG. 7 is a perspective of the baffle assembly 76. As described above, the baffle assembly 76 includes the pair of outer baffles 78, 79 and the inner baffle 80, wherein each of the baffles 78, 79, 80 extend laterally across the interior of the duct 46 (FIGS. 1–3, 5, and 6). The outer baffles 78, 79 are coupled to each other and the inner baffle 80 with a plurality of struts 84 coupled to each baffle 78, 79, 80. The outer baffles 78, 79 each have an upstream wall 152, 154 and a downstream wall 156, 158. Each upstream wall 152, 154 has an upstream surface 160, 162 and a downstream surface 164, 166. Additionally, each downstream wall 156, 158 has an upstream surface 168, 170 and a downstream surface 172, 174. The downstream surfaces 172, 174 of the downstream walls 156, 158 are at least partially coated with a high-emissivity material to reduce the reflection of infrared radiation from hot metal components of the engine 10 (FIG. 1) and the infrared suppression system 12 off of the downstream surfaces 172, 174, and thereby facilitate decreasing the infrared signature of the engine 10. Although other materials may be used without departing from the scope of the present invention, in one embodiment the surfaces 172, 174 are coated with at least one of Rust-Oleum® Flat Black paint, available from Rust-Oleum Corporation of Vernon Hills, Ill., and Dupli-Color® DH 1602 High Heat Black, available from Dupli-Color Products Company of Cleveland, Ohio.

The upstream walls 152, 154 are directly exposed to hot combustion gases exhausted by the engine 10 (shown in FIG. 1). The upstream walls 152, 154 are also directly exposed to hot components (not shown) of the engine 10 and therefore will reflect infrared radiation emanating from the hot engine components. Each upstream wall 152, 154 shields the upstream surface 168, 170 of the respective downstream wall 156, 158 so the downstream walls 156, 158 are not directly exposed to the hot combustion gases exhausted by the engine 10 and flowing through the duct 46. Because of this protection along the upstream surfaces 168, 170 of the downstream walls 156, 158, the downstream walls 156, 158 attain a relatively low temperature in comparison to the upstream walls 152, 154. Maintaining a relatively low temperature of the downstream walls 156, 158 facilitates reducing the infrared signature of the engine 10 because the downstream walls 156, 158 can be viewed by direct line of sight from the system exhaust opening 90 (FIGS. 2, 3, and 6). In comparison, the upstream walls 152, 154 can only be viewed through the exhaust opening 90 by reflections. In one embodiment, the upstream walls 152, 154 are pivotally coupled to their respective downstream walls 156, 158 to allow for relative thermal expansion and contraction.

Figure 8:
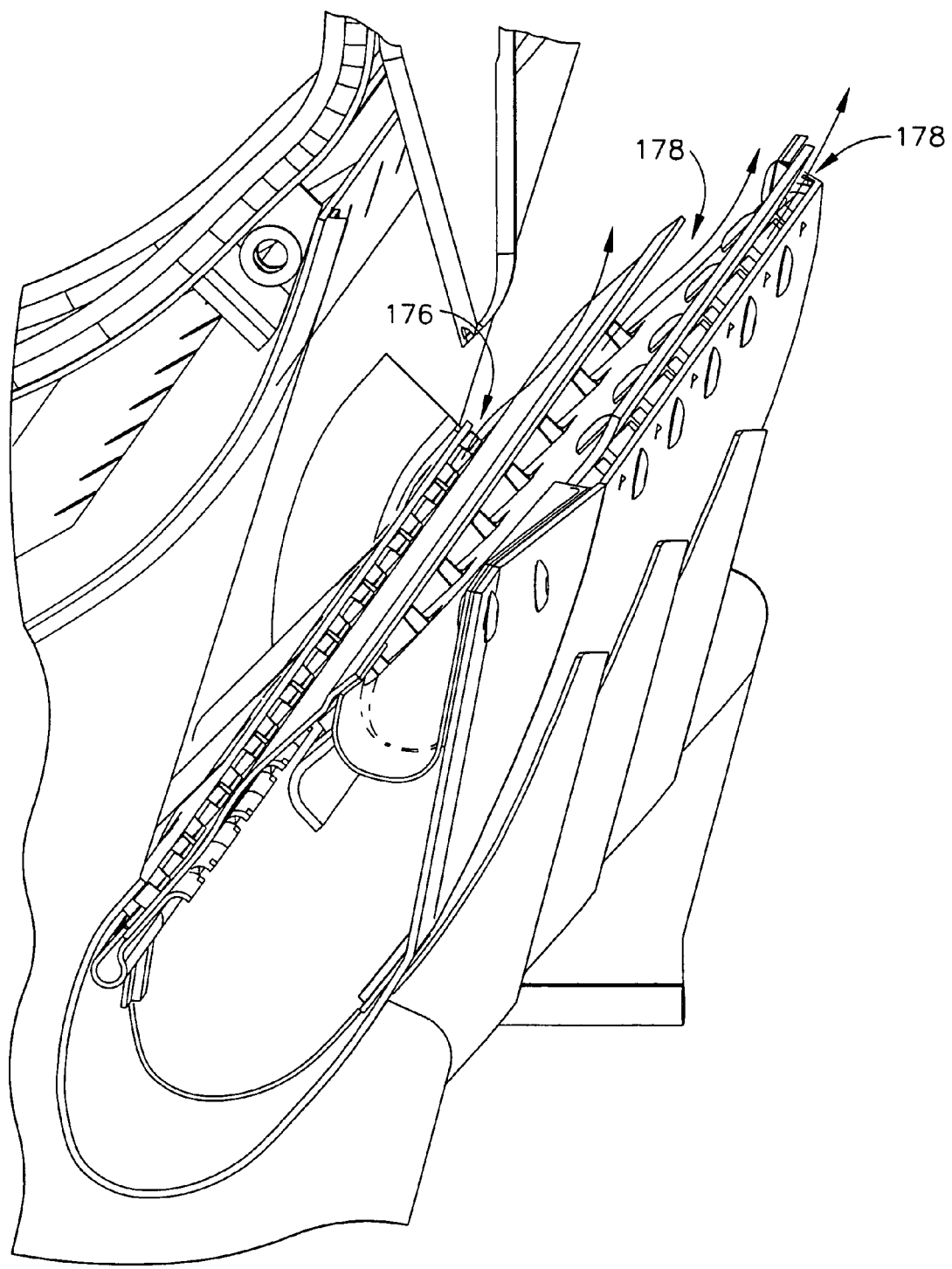
FIG. 8 is a perspective of a portion of the baffle assembly shown in FIG. 7.

Additionally, the downstream walls 156, 158 are also maintained at a relatively cool temperature by the cool ambient air flowing through each respective interior passage 81, 83 of the baffles 78, 79. The cool ambient air flowing through the interior passages 81, 83 is discharged out of baffle outlet louvers 176 (also see FIG. 8) and baffle outlet slots 178 (also see FIG. 8) into the flow of hot combustion gases flowing through the intermediate section 56 of the duct 46. The cool ambient air flowing through the baffle interior passages 81, 83 maintains the downstream walls 156, 158 at a relatively low temperature and once discharged from the baffles 78, 79 the cool ambient air mixes with the hot combustion gases flowing through the section 56 to lower the overall temperature of the hot combustion gases. In addition to the cool ambient air discharged from the baffles 78, 79, the cooling air flow delivered to the intermediate section 56 from the opening 53 (FIG. 1) within the hollow shell 51 (FIG. 1) lowers the overall temperature of the hot combustion gases. The size and location of the baffle outlet louvers 176 are such that the cool ambient air is discharged uniformly across the entire downstream surface 172, 174 of the respective downstream walls 156, 158 thereby facilitating preventing eddies of the hot combustion gases from creating "hot spots" on the downstream walls 156, 158. Additionally, because the baffle outlet slots 178 open in a downstream direction, the pressure forces created by the flow of hot combustion gases causes a low-pressure region at the opening of the slots 178, thereby inducing the cool ambient air to flow into the baffle interior passages 81, 83 and out of the slots 178. The slots 178 are sized and located appropriately to encourage this pressure differential and to permit an appropriate amount of cool ambient air to flow through the slots 178 during operation of the engine 10.

The inner baffle 80 also includes an upstream wall 180 and a downstream wall 182. The upstream wall 180 has an upstream surface 184 and a downstream surface 186. Additionally, the downstream wall 182 has an upstream surface 188 and a downstream surface 190. The downstream surface 190 of the downstream wall 182 is at least partially coated with a high-emissivity material to reduce the reflection of infrared radiation from hot metal components of the engine 10 and the infrared suppression system 12 off of the downstream surface 190, and thereby increase absorption of such radiation by the surface 190. Accordingly, the high-emissivity coating on the downstream surface 190 facilitates decreasing the infrared signature of the engine 10. Although other materials may be used without departing from the scope of the present invention, in one embodiment the downstream surface 190 is coated with at least one of Rust-Oleum® Flat Black paint, available from Rust-Oleum Corporation of Vernon Hills, Ill., and Dupli-Color® DH 1602 High Heat Black, available from Dupli-Color Products Company of Cleveland, Ohio.

The upstream wall 180 is directly exposed to hot combustion gases exhausted by the engine 10 into the duct 46. The upstream wall 180 is also directly exposed to hot engine components and therefore will reflect infrared radiation emanating from the hot engine components. The upstream wall 180 shields the upstream surface 188 of the downstream wall 182 so that the downstream wall 182 is not exposed to the hot combustion gases exhausted by the engine 10 and flowing through the duct 46. To increase this protection, the upstream surface 184 of the upstream wall 180 is at least partially coated with a low-emissivity material to reduce the emissivity of the upstream surface 184 and thereby reduce an amount of infrared radiation emitted from the surface 184. Additionally, by increasing the amount of infrared radiation that the upstream surface 184 reflects, the upstream wall 180 absorbs less radiation and therefore transmits less radiation to the upstream surface 188 of the downstream wall 182. In one embodiment, the upstream surface 184 of the upstream wall 180 is coated with a sputtered noble metal. In one embodiment, the inner baffle 80 includes a radiation shield 191 mounted between the upstream wall 180 and the downstream wall 182. The radiation shield 191 increases a temperature of the upstream wall 180 to facilitate preventing soot from forming on the upstream surface 184 of the upstream wall 180. The formation of soot on the upstream surface 184 of the upstream wall 180 may inhibit the ability of the low-emissivity coating on the upstream surface 184 to reflect infrared radiation.

Because the upstream wall 180 shields the upstream surface 188 of the downstream wall 182, the downstream wall 182 attains a relatively low temperature in comparison to the upstream wall 180. Maintaining a relatively low temperature of the downstream wall 182 facilitates reducing the infrared signature of the engine 10 because the downstream wall 182 can be viewed by direct line of sight from the system exhaust opening 90. In comparison, the upstream wall 180 can only be viewed through the exhaust opening 90 by reflections. In one embodiment, the upstream wall 180 is pivotally coupled to the downstream wall 182 to allow for relative thermal expansion and contraction.

Additionally, the downstream wall 182 is also maintained at a relatively cool temperature by the cool ambient air flowing through the interior passage 85 of the inner baffle 80. The cool ambient air flowing through the interior passage 85 is discharged out of a plurality of outlets 193 into the hot combustion gases flowing through the intermediate section 56 of the duct 46. In one embodiment, a plurality of turning vanes 195 are mounted on the upstream surface 188 of the downstream wall 182 to facilitate discharge of the cool ambient air out of the outlets 193. In an alternative embodiment, the plurality of turning vanes are mounted on the downstream surface 186 of the upstream wall 180. In yet another alternative embodiment, the inner baffle 80 includes only one turning vane mounted thereon. It should be understood that the inner baffle 80 may include any number of turning vanes mounted thereon, and may include turning vanes mounted on both the upstream surface 188 of the downstream wall 182 and the downstream surface 186 of the upstream wall 180. The cool ambient air flowing through the baffle interior passage 85 maintains the downstream wall 182 at a relatively low temperature, and once discharged from the baffles 80, the cool ambient air mixes with the hot combustion gases flowing through the section 56 to lower the overall temperature of the hot combustion gases. In addition to the cool ambient air discharged from the baffle 80, the cooling air flow delivered to the intermediate section 56 from the opening 53 lowers the overall temperature of the hot combustion gases. An inner baffle support 192 supports the baffle 80 to add structural rigidity to the inner baffle 80.

Because the outlets 193 open in a downstream direction, the pressure forces created by the flow of hot combustion gases would tend to create a low-pressure region at the opening of the outlets 193, thereby inducing the cool ambient air to flow into the interior passage 85 of the baffle 80 and out of the outlets 193. The outlets 193 are sized and located appropriately to encourage this pressure differential and to permit an appropriate amount of cool ambient air to flow through the outlets 193 during engine operation.

Each baffle 78, 79, 80 includes a first lateral end 194, 196, 198 and a second lateral end 200, 202, 204. The baffles 78, 79, 80 are open at their respective first ends 194, 196, 198 and second ends 200, 202, 204 to allow cool ambient air drawn through the respective openings 87, 89, 91 in the inner shell 70 (FIGS. 1–3, 5, and 6) to flow through their respective interior passages 81, 83, 85. In one embodiment, the baffles 78, 79 include a plurality of thermally insulated seals 206 positioned within the baffle outlet slots 178 adjacent the respective first ends 194, 196 and second ends 200, 202 to thermally insulate the respective upstream walls 152, 154 from the respective downstream walls 156, 158. The baffles 78, 79, 80 are held together by two end plates 208, one at their respective first ends 194, 196, 198 and one at their respective second ends 200, 202, 204. The end plates 208 are pivotally coupled to the inner baffle 80 to allow for relative thermal expansion and contraction of the baffles 78, 79 during operation of the engine 10. The end plates 208 are fixedly coupled to the outer baffles 78, 79. In one embodiment, the end plates 208 are welded to the outer baffles 78, 79.

The baffle assembly 76 is removably coupled to the duct 46, and more specifically the inner shell 70, in any suitable manner. For example, in the exemplary embodiment shown in FIG. 7 the baffle assembly is removably coupled to the inner shell 70 using a plurality of openings 209 within the inner baffle 80 and threaded fasteners (not shown) received within the openings 209. The baffle assembly 76 is guided into position by rails 211 and a plate 210 on each of the end plates 208 that communicates with the respective guide pin 143 (FIG. 5) on the inner shell 70 to securely couple the baffle assembly to the duct 46. The baffle assembly 76 can be easily removed from the duct 46 by decoupling the threaded fasteners from the opening 209 and sliding the baffle out of the duct 46. Although the coupling between the baffle assembly 76 and duct 46 is described and illustrated herein in an exemplary manner, it should be understood that any suitable fastener method and apparatus may be used to couple the baffle assembly 76 to the duct 46. The baffle assembly 76 is coupled to the inner shell 70 in a manner that prevents the hot combustion gases from impinging on the shell 70. More specifically, the baffle assembly 76 is coupled to the inner shell 70 such that hot combustion gases flow through transition section 54 into the intermediate section 56 without impinging upon the inner shell 70. The inner shell 70 is insulated from the combustion gases by directing cooling air received from the cavity 68 (FIG. 2) between the end plates 208 of the baffle assembly 76. Accordingly, the inner shell 70 is not heated by the hot combustion gases to a temperature causing the shell 70 to emit undesirable amounts of infrared radiation.

The above-described infrared suppression system 12 is cost-effective and reliable for reducing an infrared radiation signature. More specifically, the infrared suppression system described herein improves infrared signature suppression through improved cooling of system components, adjustment to system geometry, and strategic application of high and low emissivity coatings. As a result, the above-described infrared suppression system exhibits improved infrared signature reduction, reduced performance penalties, and reduced system weight. Additionally, the suppression system includes a single integrated baffle assembly 76 that can be conveniently inserted or removed manually from the infrared suppressor by an engine operator. This removable feature may offer a significant performance advantage. A vehicle using the infrared suppression system during non-combat conditions can be operated without the baffle assembly 76, which inherently tends to block exhaust gas flow and cause some associated engine performance penalties. However, if the vehicle is being operated under combat conditions, it is desirable to reduce the infrared signature even though this causes some degree of engine performance penalty and the baffle assembly 76 can be conveniently inserted to achieve this. The single integrated baffle assembly 76 additionally provides an inherent structural strength and integrity in the duct 46 and adjacent the engine exhaust 34, wherein the forces of the hot combustion gases flowing through the engine 10 and the duct 46 create stresses on anything blocking their flow path. Another advantage to the integrated baffle assembly 76 is that the individual baffles 78, 79, 80 can be maintained in their proper relative location in such a way as to block line-of-sight viewing of hot metal components from outside the system exhaust opening 90.

Although the invention is herein described and illustrated in association with an aircraft, and more specifically, in association with the suppression of the infrared signature of an aircraft, it should be understood that the present invention is generally applicable to the suppression of the infrared signature of any vehicle. Accordingly, practice of the present invention is not limited to the suppression of the infrared signature of an aircraft, nor is practice of the present invention limited to aircraft generally. Additionally, although the invention is herein described and illustrated in association with a turboshaft gas turbine engine, and more specifically in association with a gas turbine engine used to power an external mechanism, such as a helicopter rotor, it should be understood that the present invention is generally applicable to other types of gas turbine engines, such as turbofan and turboprop engines. Accordingly, practice of the present invention is not limited to the suppression of the infrared signature of a turboshaft gas turbine engine.

Exemplary embodiments of infrared signature suppression systems are described above in detail. The systems are not limited to the specific embodiments described herein, but rather, components of each system may be utilized independently and separately from other components described herein. Each infrared signature suppression system component can also be used in combination with other infrared signature suppression system components.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. An infrared signature suppression system for reducing infrared radiation emitted by a vehicle, said system comprising:
   an elongate duct mounted on the vehicle having a hollow interior extending along an axial centerline between an upstream end and a downstream end for transporting exhaust gas emitted by the vehicle; and
   a baffle positioned in the hollow interior of the duct between the upstream end and the downstream end;
   wherein at least a portion of at least one of said duct and said baffle includes an emissivity coating for reducing infrared radiation emitted by the vehicle.

2. A system in accordance with claim 1 further comprising a deswirling device connected to said duct adjacent said upstream end configured to deswirl the exhaust gas transported through the hollow interior of the duct.

3. A system in accordance with claim 1 wherein said duct comprises a radially outer shell and a radially inner shell coupled to said outer shell, said inner shell having a radially inner surface, wherein at least a portion of said radially inner surface is coated with a high-emissivity material.

4. A system in accordance with claim 1 wherein said baffle is a first baffle and said infrared signature suppression system further comprises a second baffle positioned in the hollow interior of the duct between the upstream end and the downstream end, at least a portion of said second baffle being positioned upstream from said first baffle.

5. A system in accordance with claim 4 wherein said first baffle includes an upstream wall and a downstream wall.

6. A system in accordance with claim 5 wherein said upstream wall includes an upstream surface and a downstream surface, and wherein at least a portion of said upstream surface is coated with a low-emissivity material.

7. A system in accordance with claim 6 wherein said low-emissivity material comprises a sputtered noble metal.

8. A system in accordance with claim 7 wherein said downstream wall includes an upstream surface and a downstream surface, and wherein at least a portion of said downstream surface is coated with a high-emissivity material.

9. A system in accordance with claim 5 wherein said first baffle includes a radiation shield mounted between said upstream wall and said downstream wall, and wherein said radiation shield is configured to increase a temperature of said upstream wall.

10. A system in accordance with claim 5 wherein said first baffle further comprises a turning vane mounted between said upstream wall and said downstream wall, and wherein said turning vane is configured to direct cooling air between said upstream wall and said downstream wall.

11. A system in accordance with claim 4 wherein said second baffle has an upstream wall and a downstream wall, and wherein at least a portion of said downstream wall is coated with a high-emissivity material.

12. An aircraft propulsion system for powering an airframe during flight comprising:
   an aircraft engine having an outlet; and
   an infrared signature suppression system mounted downstream from the aircraft engine outlet for reducing infrared radiation emitted by said engine, said suppression system comprising:
      an elongate duct mounted downstream from the aircraft engine for transporting exhaust gas emitted by said engine outlet, said duct having a hollow interior extending along a centerline between an upstream end of the duct and a downstream end of the duct;
      a baffle mounted inside the hollow interior of the duct for obstructing line-of-sight viewing of said metal engine components from the downstream end; and
      an emissivity coating applied to at least one of said duct and said baffle.

13. An engine in accordance with claim 12 further comprising a deswirling device connected to said duct adjacent said upstream end configured to deswirl the exhaust gas transported through the hollow interior of the duct.

14. An engine in accordance with claim 12 wherein said duct further comprises a radially outer shell and a radially inner shell coupled to said outer shell, said inner shell having a radially inner surface, wherein at least a portion of said radially inner surface is coated with a high-emissivity material.

15. An engine in accordance with claim 14 wherein said radially inner shell has a plurality of generally circular openings for directing cooling air to said baffle.

16. An engine in accordance with claim 12 wherein said baffle is a first baffle and said infrared signature suppression system further comprises a second baffle positioned in said duct so that at least a portion of said second baffle is positioned upstream from said first baffle.

17. An engine in accordance with claim 16 wherein said first baffle includes an upstream wall and a downstream wall, said upstream wall includes an upstream surface and a downstream surface, and wherein at least a portion of said upstream surface is coated with a low-emissivity material.

18. An engine in accordance with claim 16 wherein said first baffle includes an upstream wall and a downstream wall, said downstream wall includes an upstream surface and a downstream surface, and wherein at least a portion of said downstream surface is coated with a high-emissivity material.

19. An engine in accordance with claim 16 wherein said second baffle includes an upstream side and a downstream side, wherein at least a portion of said downstream side is at least partially coated with a high-emissivity material.

* * * * *